THERMOELECTRIC ASSEMBLIES

Original Filed Oct. 10, 1968 3 Sheets-Sheet 1

INVENTOR.
THORE M. ELFVING

BY

Flehr and Swain
ATTORNEYS

INVENTOR.
THORE M. ELFVING
BY
Flehr and Swain
ATTORNEYS

INVENTOR.
THORE M. ELFVING
BY
Flehr and Swain
ATTORNEYS

United States Patent Office 3,671,326

Patented June 20, 1972

3,671,326

THERMOELECTRIC ASSEMBLIES

Thore M. Elfving, 433 Fairfax Ave., San Mateo, Calif. 94402

Continuation of application Ser. No. 781,672, Oct. 10, 1968, which is a continuation of application Ser. No. 460,209, June 1, 1965. This application Dec. 4, 1969, Ser. No. 876,161
Int. Cl. H01v *1/30, 1/32*
U.S. Cl. 136—205 7 Claims

ABSTRACT OF THE DISCLOSURE

A thermoelectric assembly having bimetallic junction bridge elements comprised of copper in contact with end plates permanently secured to the semiconductor material to conduct the electric current passing through the semiconductor material and aluminum fins for heat exchange to air.

This application is a continuation of application Ser. No. 781,672 filed Oct. 10, 1968 which is a continuation of application Ser. No. 460,209 filed June 1, 1965, both now abandoned.

The present invention relates generally to thermoelectric assemblies and more particularly to thermoelectric heat pumps and subcouple and couple assemblies to be incorporated in such heat pumps. The present invention relates also to thermoelectric generating devices.

In my copending application Ser. No. 441,804, filed Mar. 22, 1965, now Pat. No. 3,287,923 there are shown thermoelectric heat pump systems of both the liquid-to-air and air-to-air heat transfer type utilizing tube sections with or without fins as junction bridges. Such tube sections are preferably made from aluminum in order to save weight.

Bodies of semiconductor material are not easily soldered to aluminum. Thus, it is preferable to first solder the semiconductive bodies to copper elements so that the critical joints between the semiconductor bodies and the metal can be made under carefully controlled conditions and then easily inspected.

In said copending application there is suggested the use of finned tubing sections with an inside lining of copper and outer aluminum fins.

According to the present invention, suitable copper elements are first soldered to the semiconductive bodies. These elements can then be attached to the copper portion of such bimetallic sections, such as by soldering, to form couple or subcouple assemblies. The copper elements can also be given a suitable size and shape for attachment to a plain pipe section of copper or to aluminum sections provided with a copper sleeve or shroud. By providing such subcouple or couple assemblies ready for attachment to junction bridges of various types, very simple and efficient heat pump assemblies with large, light weight heat transfer surfaces can be built.

It is a general object of the present invention to provide improved thermoelectric heat pumps utilizing preassembled subcouple or couple units in combination with junction bridges.

It is another object of this invention to provide package units comprising improved single subcouple or couple assemblies for incorporation in thermoelectric heat pumps of various types.

It is another object of the present invention to provide thermoelectric heat pumps utilizing preassembled couple and/or subcouple assemblies in combination with bimetallic junction bridges.

The critical joint between the bodies of semiconductor material and adjoining copper parts must not only be uniformly produced under strictest control but must also be protected from damage through stress, shocks and vibration, moisture and corrosion during the final mounting and continued use of the heat pump assembly. Thermal shocks constitute a serious problem in thermoelectric applications, especially in the air conditioning field where the hot and cold junctions are switched when the controls call for heating instead of cooling. This problem is also common in power producing apparatuses utilizing thermoelectric material for the direct production of electricity. Cracks in the semiconductive material and/or increased resistance and deterioration of the critical joints may result from thermal and mechanical shock and from vibration.

Prestressing by compression plates on the hot and cold sides of plane modules or the use of pressure plates, leaf springs and a tie strap around other types of assemblies lead to an uneven distribution of pressure with some joints under heavy pressure and other joints under too little pressure. Friction and uneven relative movements inside the package cause strain on individual joints and if design elements such as fins are included in the expanding structures, the prestressing causes buckling and gradual deterioration.

According to the present invention, the prestressing is directed to each individual couple or subcouple assembly. The number of parts included in each prestressed assembly and the length involved in expansion or contraction is thereby reduced to a minimum.

It is another object of the present invention to provide individually prestressed subcouple and couple assemblies for improved protection of the semiconductive bodies and the critical joints in thermoelectric assemblies of all kinds.

Further objects and advantages of this invention and features of novelty which characterize the invention will be pointed out in the following description and the claims forming a part of the specification.

For a better understanding of this invention, reference is made to the accompanying drawings, in which FIG. 1 is a sectional view of a portion of a liquid-to-gas (air) heat pump assembly incorporating a prestressed couple assembly in accordance with the invention;

Figure 1:
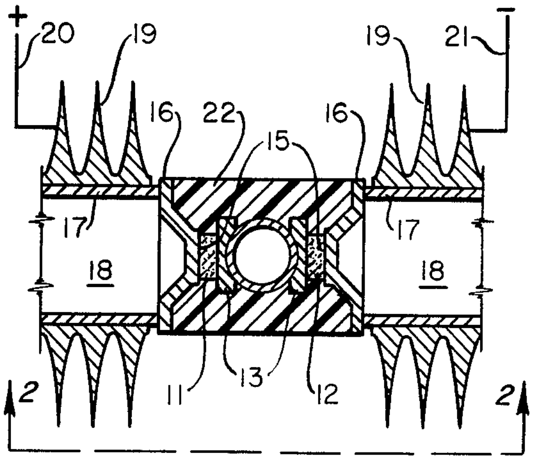
Figure 2:
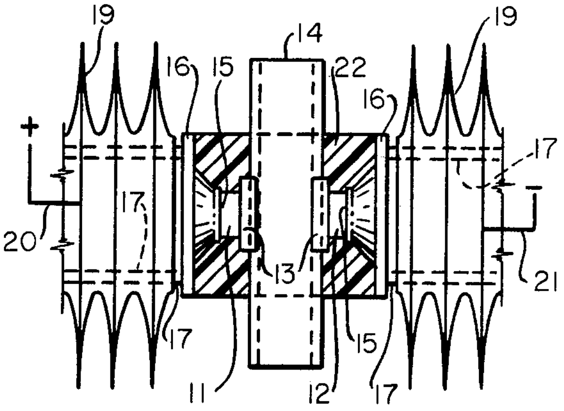
FIG. 2 is a view, partly in section, taken along the line 2—2 of FIG. 1.

Referring to FIGS. 1 and 2, there is shown a pair of semiconductive blocks 11 and 12 of n and p type, respectively, each having one end, for example, the cold junction end, soldered to the flat side of copper elements or strips 13. The other sides of the copper elements 13 are provided with a rounded groove or surface to receive the cylindrical surface of tube section 14 to which the elements 13 are attached. The elements may be attached to opposite sides by soldering. The tube sections 14 can be copper or aluminum; if aluminum, the pipe is preferably provided with a copper sleeve to facilitate soldering. The tube section 14, together with the strips 13, form a junction bridge between the similar (cold) junction ends of the pair of semiconductor bodies. The tube section 14 may be joined to other similar sections by non-conductive means to form conduits for passing of a liquid to be cooled by the thermoelectric assembly. The semiconductive blocks 11 and 12 have their other (hot) junction ends soldered to the projecting surface 15 of copper discs or end plates 16. The other side of the discs 16 may be soldered to the inner copper lining 17 of a bimetallic finned tubing section 18, having an outer fin tube 19 of aluminum. The copper discs 16, together with the finned tubing sections 18, form the hot junction bridges in the thermoelectric assembly which in a known way comprises thermocouples in series along the axis of the finned tube sections and across the liquid pipe section 14. The heat pump can be energized through leads 20 and 21 to form an air-cooled liquid cooler utilizing aluminum fins for the heat transfer to air.

The semiconductor bodies 11 and 12, together with the copper strips 13, the pipe section 14 and the copper discs 16, form a complete thermocouple assembly which, according to the invention, can be presoldered, prestressed and even pre-insulated as a unit for incorporation in the heat pump assembly. In the same way, each of the semiconductive bodies, together with one of the copper elements 13 and one of the copper discs 16, forms a subcouple assembly which can be presoldered, prestressed and preinsulated as a unit before it is attached to the pipe section 14.

By way of example, the semiconductive blocks are first separately soldered by bismuth-tin solder to a copper element and a copper disc or end plate at a carefully controlled temperature to form a high quality joint. The two subcouple assemblies thus formed are then placed on each side of a pipe section 14 and prestressed by applying pressure on the copper discs across the semiconductive blocks and the pipe section. In this prestressed condition, the space between the discs 16, indicated in the drawing, is filled with a suitable adhesive material 22 such as epoxy and left to harden or solidify while under pressure. During this process the temperature of the whole assembly in its fixture is raised for a short period of time above the melting point of a soft solder material applied to the copper elements and the pipe section (or the copper sleeve thereon), having a melting point considerably below the melting point of bismuth-tin. The copper elements are now soldered to the tube section. After lowering the temperature, the couple assembly is united to a unit which, after the setting of the epoxy, is kept together in a prestressed condition by the strong bond created by the epoxy.

The unit is insensitive to shocks of every nature and is also protected from moisture and corrosion. Thermal expansion is insignificant as the length is small and independent of the polarity of the current. The larger assembly in which a unit of this type is incorporated needs no prestressing as the only critical joints are inside the already prestressed unit and all stress on the unit as such is absorbed by the prestressing without being transmitted to the inside critical joints. The concept of a prestressed couple assembly solves the shock problem of thermoelectric assemblies.

Figure 3:
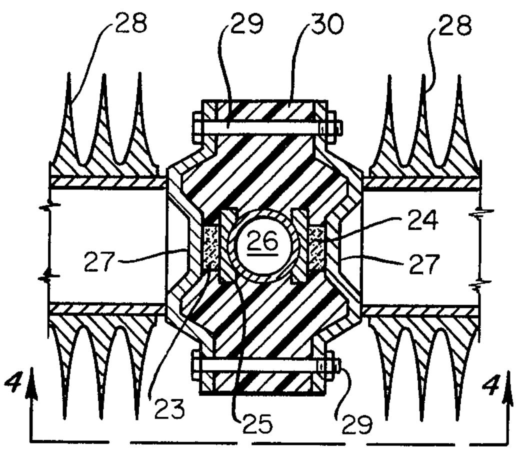
FIG. 3 is a sectional view of a portion of a liquid-to-gas (air) heat pump assembly incorporating another prestressed couple assembly in accordance with the present invention.
Figure 4:
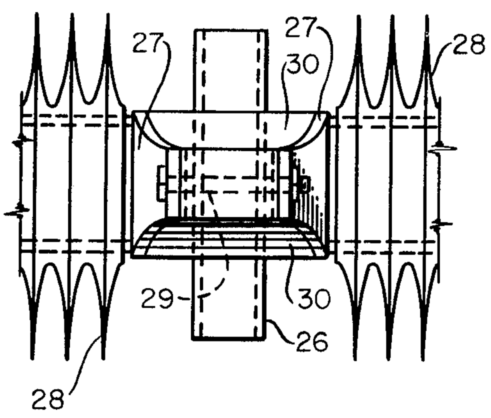
FIG. 4 is a view taken along the line 4—4 of FIG. 3.

In FIGS. 3 and 4 there is shown a similar couple structure with semiconductive bodies 23 and 24, copper elements 25, a pipe section 26 and copper discs or end plates 27 which in the same way are soldered to bimetallic finned tubing sections for heat transfer to air through aluminum fins 28. The copper discs 27 are in this embodiment of the invention provided with extended ears. The discs are then bolted together by nonconductive bolts 29 or by metal bolts suitably insulated from contact with the ears. The couple assembly can after or during the soldering process, described above, be prestressed by tightening the bolts 29 and be kept under constant pressure during and after filling the space between the copper discs 27 with a suitable insulating material 30 which, in this case, can be of a less adhesive nature and have a lower heat conductivity.

The described liquid-to-air heat pumping systems have all the desired properties of an ideal thermoelectric heat pump: large heat transfer surfaces to both air and liquid; low weight in relation to capacity; high efficiency; mechanically strong and independent of thermal shocks.

In both the described embodiments of the invention the temperature drop from the junction ends to the roots of the aluminum fins is low and the heat transfer capacity to air can simply be adjusted by choosing a shorter or longer finned tubing section after selecting a fin spacing matching the available air circulating fan system.

Figure 5:
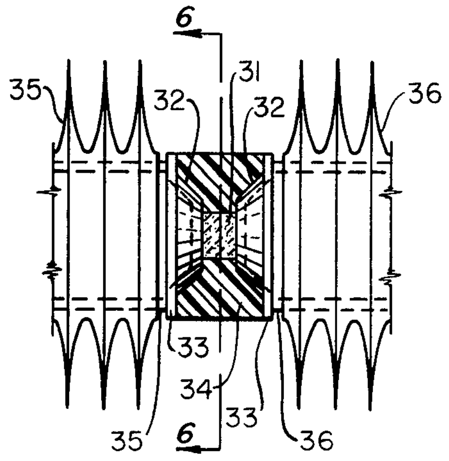
FIG. 5 is an elevational view, partly in section, of a portion of a gas (air) -to- gas (air) heat pump assembly incorporating a thermoelectric subcouple assembly in accordance with the present invention.
Figure 6:
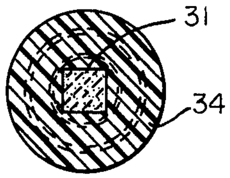
FIG. 6 is a sectional view taken along the line 6—6 of FIG. 5.

Referring to FIGS. 5 and 6, there is shown a portion of an air-to-air heat pump assembly comprising a subcouple according to the invention. The subcouple can be of n or p conductivity type with the semiconductive body 31 soldered between the elevated portions 32 of copper disc 33. The assembly forms an hourglass-shaped space with the semiconductive body in the center. Pressure can be applied to the discs during the soldering process and is not relieved until the space between the discs has been filled with a foam material 34 with strong bonding power and good insulation properties such as polyvinyl chloride foam of relatively high density or epoxy which is allowed to harden or set under pressure. The prestressed, presoldered and pre-insulated subcouple unit can thereafter be soldered to the copper lining of bimetallic finned tubing sections 35 and 36 which, together with the adjoining copper discs, form hot and cold junction bridges, respectively. The assembly may be incorporated in a larger assembly with several subcouples of alternate type in a row. The length of the finned tubing sections can be adjusted to the heat load or heat pumping capacity and, generally, the hot junction bridges should be longer than the cold junction sections or have a tighter fin spacing.

Figure 7:
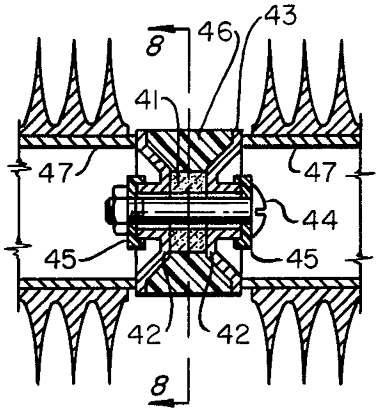
FIG. 7 is a sectional view of a portion of an air-to-air heat pump assembly incorporating another thermoelectric subcouple in accordance with the invention.
Figure 8:
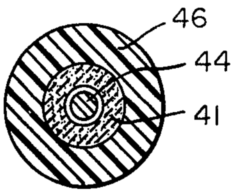
FIG. 8 is a sectional view taken along the line 8—8 of FIG. 7.

In FIGS. 7 and 8 there is shown another air-to-air subcouple assembly according to the invention. The semiconductive body 41 of n or p type is annular and is presoldered to a ring-shaped elevated portion 42 of copper disc 43. The disc includes a hole which is aligned with the hole in the annular body. The edges of the holes in the discs are countersunk to increase the bolting distance between the hot and cold discs, as illustrated by the drawing, A non-conductive bolt 44, centered by non-conductive washers 45 is placed through the hole in the annular body and the discs and tightened for prestressing. The space between the discs is filled with a suitable insulating material 46 whereafter the unit can be soldered to finned tubing sections and incorporated in a larger assembly, as previously described. The discs shown in the figure are adapted for soldering to a tubular copper lining 47, but one or both of the discs can be shaped for soldering to other types of junction bridges. It is apparent that rather than a single body forming the annular semiconductor body, a plurality of smaller bodies may be concentrically arranged to form the "annular" semiconductor body. As referred to herein and in the appended claims, an "annular body" is intended to mean either of the foregoing.

Figure 9:
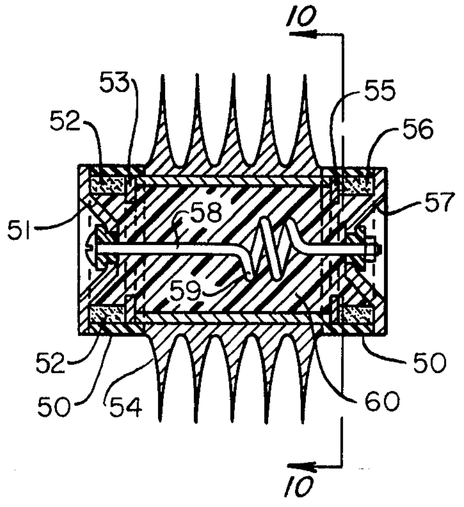
FIG. 9 is a sectional view of a prestressed couple assembly in accordance with another embodiment of the invention incorporating annular semiconductor bodies.
Figure 10:
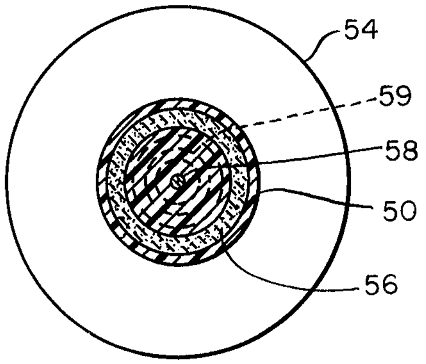
FIG. 10 is a sectional view taken along the line 10—10 of FIG. 9.

In FIGS. 9 and 10 is shown how a subcouple assembly can be made into a complete couple assembly by including a finned tubing section in the assembly. A couple assembly built from annular semiconductive bodies with a central bolt for prestressing will then include, for example, a first cold side disc 51, an annular semiconductive body of n-type material 52, a first hot side disc 53 in the form of a washer, a finned tubing section 54, a second hot side disc 55, an annular body of p-type semiconductor material 56, and a second cold side disc 57, all members bolted together and prestressed by a central bolt 58 with spring portion 59. The bolt extends through the assembly from the first cold side disc to the second cold side disc.

The described unit represents a complete air-cooled heat pump with cold junction members at each end adaptable for various applications. The end members can be given various shapes to suit special applications but the principal design with annular semiconductive bodies and central holes for bolting and prestressing should be maintained. The central bolt can be made of a low conductivity metal such as stainless steel provided that the bolt never touches the copper discs or the annular body. The inside cavity of the finned tubing section is filled with a foam insulation 60. The spring loading can be achieved in others ways as, for example, by using a conventional bolt with a coil spring interposed between an end disc and the nut or head of the bolt.

Prestressed couple units of this type can be soft soldered with butt-joints to finned sections to form air-to-air heat pumps with alternate hot and cold fin sections. Normally, hot junction sections can be made longer than cold junction sections and/or tighter fin spacing for larger heat transfer capacity. The annular bodies can, on their outside, be protected by an insulating sleeve 50.

Figure 11:
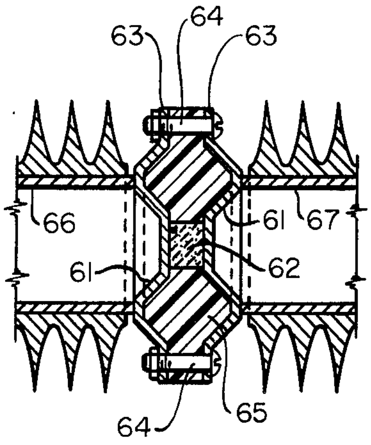
FIG. 11 is a sectional view of a portion of another air-to-air heat pump employing another prestressed subcouple assembly in accordance with the invention.

In FIG. 11 there is shown another type of bolted subcouple assembly with copper discs 61 soldered to each end of a semiconductive body 62 of n or p type. The discs 61 are each provided with at least two ears 63 with holes to accommodate nonconductive prestressing bolts 64. An insulation 65 is formed in the space between the discs and the unit soldered to hot and cold junction bridges in the form of bimetallic tubing sections 66 and 67, respectively.

Figure 12:
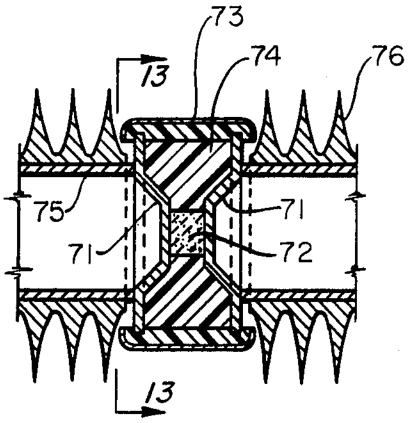
FIG. 12 is a sectional view of a portion of another air-to-air heat pump incorporating still another subcouple assembly.
Figure 13:
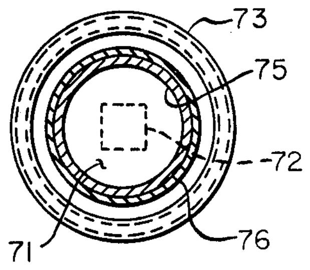
FIG. 13 is a sectional view taken along the line 13—13 of FIG. 12.

In FIGS. 12 and 13 there is shown still another subcouple assembly similar to the one shown in FIG. 11. Here, the discs 71 are presoldered to a semiconductive body 72 and pressed together by non-conductive clamping means 73. The wrap is a non-conductive type and is applied by a special tool after filling the space between the discs with a suitable foam insulation 74. The subcouple is, as a unit, soft soldered to the copper lining 75 of a bimetallic tubing section with aluminum fins 76.

Figure 14:
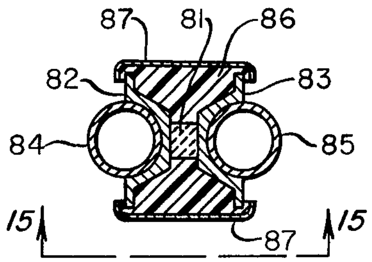
FIG. 14 is a sectional view showing a portion of a liquid-to-liquid heat pump incorporating subcouples in accordance with the invention.
Figure 15:
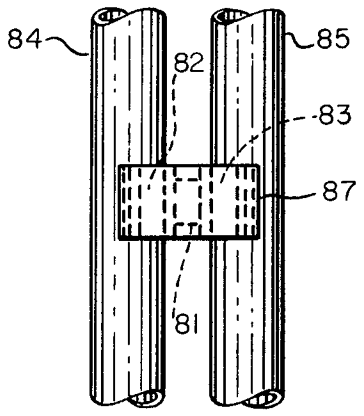
FIG. 15 is a view taken along the line 15—15 of FIG. 14.

Referring to FIGS. 14 and 15, there is shown a subcouple assembly for liquid-to-liquid thermoelectric assemblies. At least one semiconductive body 81 of n or p type is soldered to the elevated flat surface of copper elements or end plates 82 and 83 which are grooved to receive pipe sections 84 and 85. The copper elements 82 and 83, shown in the drawing, are only wide enough to accommodate one semiconductive block but can, according to the invention, be made two or three times as wide for the corresponding number of blocks placed in parallel along the pipe sections for correspondingly increased maximum current and capacity. The pipe sections can be of copper for direct soft soldering to the copper elements 82 and 83 or made from aluminum pipes in which case they are preferably provided with a copper sleeve or shroud of the same length as the copper elements. The hot and cold pipe sections can be joined into continuous conduits for the passage of the liquid to be cooled on the cold junction side and the cooling liquid on the hot junction side. The portions of the copper elements 82 and 83 extending on both sides of the semiconductive block are bent away from each other to provide a larger insulation distance. Across said extended portions of the copper elements there are non-conductive clamping means for prestressing the critical joints as previously described. A foam insulation 86 is filled in the inside space around the semiconductive body. A subcouple assembly comprising the semiconductive body, the copper elements 82 and 83, the clamping means 87 and the insulation 86 will form a building unit or subcouple of n or p type for construction of thermoelectric heat pump assemblies of a great variety of the liquid-to-liquid type. The drawing shows a unit for application to parallel pipe sections. By changing one of the copper elements so that the grooved surface is provided in the other direction, the unit can be applied between pipe sections running in a perpendicular direction in relation to each other for three-dimensional mounting.

Thus, it is seen that improved thermoelectric subcouple and couple units have been provided for the building of liquid-to-liquid, liquid-to-air and air-to-air systems of utmost simplicity and reliability. The basic units include an individually pre-soldered, prestressed and pre-insulated subcouple or couple with the critical joints protected from thermal shocks, mechanical shocks and vibrations, moisture and corrosion. The units can easily be attached to heat transfer means of various kinds whereby thermoelectric assemblies can be built without involving any process connected to the semiconductive material itself or its critical joints.

I claim:

1. A thermoelectric assembly comprising a semiconductor body of p-type or n-type material having hot and cold junction sides, a separate copper end element as a good contact metal soldered to each side of said body, one side of said body and its end element adapted to be in heat exchange relationship with a gaseous medium, and a bimetallic member electrically and thermally connected to said one side end element of said semiconductor body and serving as a junction bridge on said one side, the said bimetallic member having a first part made of copper as a good contact metal, said copper first part in direct contact with said one side copper end element of the semiconductor body, and a second part made from aluminum as a light-weight material arranged to be in contact with the gaseous medium, and prestressing means for continuously forcing said copper end elements against said semiconductor body, said prestressing means being directed to each individual couple or subcouple in the assembly.

2. A thermoelectric assembly as in claim 1 wherein said bimetallic junction bridge member includes a finned tubing section.

3. A thermoelectric assembly as in claim 2 wherein said prestressing means comprises a bolt extending through said finned tube section.

4. A thermoelectric assembly as in claim 1 wherein said semiconductor body is annular in shape.

5. A thermoelectric heat pump assembly as in claim 1 in which the compression means includes a spring element for controlling the compressive force.

6. A thermoelectric heat pump assembly as in claim 1 in which the first part of the heat exchange member includes a tube and the second part of the heat exchange member has fins arranged around the tube.

7. A thermoelectric assembly as in claim 1 wherein said prestressing means are arranged for continuously forcing said semiconductor body with its end elements against said first part of said bimetallic member for maintaining a competent electrical joint between the end element of said semiconductor body and said first part of the bimetallic member.

No references cited.

ALLEN B. CURTIS, Primary Examiner